United States Patent [19]

Matsushima et al.

[11] Patent Number: 5,506,381
[45] Date of Patent: Apr. 9, 1996

[54] WIRE ELECTRIC DISCHARGE MACHINE

[76] Inventors: Tsutomu Matsushima, c/o Nagoya Division of Mitsubishi Electric Engineering Co., Ltd., 1-14, Yadaminami 5-chome; Toshimitsu Sakakibara, c/o Mitsubishi Denki Kabushiki Kaisha Nagoya Works, 1-14, Yadaminami 5-chome, both of Higashi-ku Nagoya-shi Aichi, Japan

[21] Appl. No.: 26,763

[22] Filed: Mar. 5, 1993

[30] Foreign Application Priority Data

Mar. 6, 1992 [JP] Japan .................. 4-049618

[51] Int. Cl.$^6$ .................................................. B23H 7/10
[52] U.S. Cl. .................. 219/69.12; 72/146; 206/388; 242/361
[58] Field of Search ................. 53/409, 430, 503, 53/504, 522; 219/69.12, 69.2, 121.22; 72/66, 127, 135, 146; 242/79, 80, 83, 129, 187, DIG. 1, DIG. 3, 360–363; 220/287, 350; 206/303, 388

[56] References Cited

U.S. PATENT DOCUMENTS

| | | | |
|---|---|---|---|
| 3,061,229 | 10/1962 | Crum | 242/83 |
| 3,351,992 | 11/1967 | Carter | 206/388 |
| 3,822,374 | 7/1974 | Ullmann et al. | 219/69.12 |
| 4,944,469 | 7/1990 | Wilson | 242/361 |
| 5,142,116 | 8/1992 | Yokomichi et al. | 219/69.12 |

FOREIGN PATENT DOCUMENTS

| | | | |
|---|---|---|---|
| 104038 | 3/1984 | European Pat. Off. | 206/388 |
| 0370112 | 5/1990 | European Pat. Off. | |
| 507878 | 7/1920 | France | 220/350 |
| 2331114 | 1/1975 | Germany | 242/83 |
| 136384 | 7/1979 | Germany | 242/83 |
| 3151803 | 8/1982 | Germany | 206/388 |
| 3628151 | 2/1988 | Germany | 242/79 |
| 3631888 | 4/1988 | Germany . | |
| 9010585 | 11/1990 | Germany . | |
| 57-19255 | 2/1982 | Japan . | |
| 59-196125 | 11/1984 | Japan | 219/69.12 |
| 60-23910 | 6/1985 | Japan | 219/121.22 |
| 60-167856 | 8/1985 | Japan | 242/361.4 |
| 61-9212 | 1/1986 | Japan . | |
| 63-114820 | 5/1988 | Japan . | |
| 63-114822 | 5/1988 | Japan . | |
| 63-123633 | 5/1988 | Japan | 219/69.12 |
| 63-174820 | 7/1988 | Japan . | |
| 63-174821 | 7/1988 | Japan . | |
| 63-312025 | 12/1988 | Japan . | |
| 2-59221 | 2/1990 | Japan | 219/69.12 |
| 2-131820 | 5/1990 | Japan | 219/69.12 |
| 3-60926 | 3/1991 | Japan | 219/69.12 |
| 3-79231 | 4/1991 | Japan | 219/69.12 |
| 4-105822 | 4/1992 | Japan | 219/69.12 |

*Primary Examiner*—Geoffrey S. Evans

[57] ABSTRACT

A wire electric discharge machine including a wire electrode collecting device for collecting a wire electrode previously used for electric discharge machining, and a guide for guiding the previously used wire electrode to the wire electrode collecting device. The guide and/or the collecting device is movable so that the guide is movable relative to the collecting device in at least two different directions. In one embodiment, the wire collecting device is vibrated.

16 Claims, 15 Drawing Sheets

5,506,381

WIRE ELECTRIC DISCHARGE MACHINE

FIELD OF THE INVENTION

The present invention relates to a wire electric discharge machine, and particularly, to a wire electric discharge machine which is able to increase the collecting capacity of used wire electrode.

BACKGROUND OF THE INVENTION

FIG. 28 shows a general wire electric discharge machine, and FIG. 29 shows the details of the lower collecting section of a wire electrode disclosed in Japanese Patent Laid-Open No. 63-312025. In FIGS. 28 and 29, numeral 1 is a wire electrode, 2 is a wire bobbin on which the wire electrode 1 is wound, and 3 is a brake roller for tensing the wire electrode 1. Numeral 4 is an auxiliary roller for brake roller 3, 5 is an upper guide roller for changing the direction of the wire electrode 1, and 6 and 7 are upper and lower wire guides, respectively, each having a nozzle for feeding working fluid to a machining gap. Numeral 8 is a workpiece to be machined, 9 is a surface plate for mounting and securing the workpiece 9, and 10 is a lower guide roller which is rotatably supported by a lower arm 12 through a block 11. Numeral 13 is a guide fitting element for guiding the wire electrode 1 to a guide pipe 14, 15 and 16 are pinch rollers for securely feeding the wire electrode 1 to a machining gap, and 17 is a guide plate for changing the direction of the wire electrode 1. The guide plate 17 also serves as a sensor for detecting if the known wire electrode auto feeder is correctly operating. Numeral 18 is a spring for urging an arm 19 downward in order to feed the wire electrode 1. The pinch roller 15 is supported by the arm 19 which is movable by an actuator 20 so as to expand the gap between the pinch rollers 15 and 16 against the pressure of the spring 18. Numeral 21 is a collecting case for collecting the wire electrode 1. Because a voltage pulse is applied between the wire electrode 1 and the workpiece 8 from a power supply (not illustrated), the collecting case 21 is generally made of an insulating material. Numeral 22 is a column of the wire electric discharge machine and numeral 23 is a base for supporting the column 22 and guiding and supporting a saddle 24 which guides and supports a machining bath.

Numeral 30 is a so-called working-fluid feeder for storing the working fluid 28, filtering the sludge produced due to electric discharge machining in the working fluid 28, and adjusting the resistivity of the working fluid 28. Numeral 26 is a working-fluid tank for storing the working fluid 28, and 27 is a pump for feeding the working fluid 28 to the machining bath 25, upper wire guide 6, and lower wire guide 7 through a pipe 29. In general, the working fluid feeder 30 is positioned close to the machine body.

The operation of the wire electric discharge machine shown in FIGS. 28-29 will now be described. The wire electrode 1 is fed from wire bobbin 2 to the collecting case 21 as shown in FIGS. 28-29 under the control of a numerical control unit (not illustrated) during electrical discharge machining. First, the wire electrode 1 from wire bobbin 2 is fed to the upper guide 6 through the brake roller 3, auxiliary roller 4, and upper guide roller 5, and then to the workpiece 8 forming the machining gap to execute electric discharge machining by the pulse voltage sent from a power supply (not illustrated). The used portion of the wire electrode 1 is slightly thinned due to machining, and passes through the lower guide 7, block 11, lower guide roller 10, guide fitting 13, and guide pipe 14 under the control of the numerical control unit, and is wound by the pinch roller 15 and 16 at a commanded speed and collected into the collecting case 21 by the guide 20 plate 17. The wire electrode 1 is curled when it is wound by the pinch rollers 15 and 16 and is collected in collecting case 21 in the form of an approximately uniform circular arc.

Because the conventional wire electric discharge machine has the structure shown in FIGS. 28-29, the curling degree of wire electrode fed and used changes due to the thickness and feed speed of the wire electrode and the erosion rate of the wire according to the particular electrical machining conditions. Therefore, with the conventional machine it has not been possible to collect efficiently the used wire electrode because the height of the collected wire electrode locally increases, thereby overflowing from the collecting case 21 even if the width of the case 21 is increased as shown in FIG. 30.

Other known wire electric discharge machines having collecting devices for collecting a used wire electrode are disclosed in Japanese Kokai's 63-114822 and 63-174820. In Japanese Kokai 63-114822, the collecting device is rotatable.

SUMMARY OF THE INVENTION

It is an object of the present invention to provide a wire electric discharge machine which efficiently collects a used wire electrode in a collecting means.

It is another object of the invention to provide a wire electric discharge machine capable of changing the collecting means by detecting that the wire electrode collecting means is full of used wire electrode.

These and other objects of the invention are accomplished by the present invention which provide a wire electric discharge machine comprising:

wire electrode collecting means for collecting a wire electrode previously used for electric discharge machining; and means for guiding the previously used wire electrode to said wire electrode collecting means; said guiding means being movable relative to said wire electrode collecting means in at least two different directions.

DETAILED DESCRIPTION OF THE PREFERRED EMBODIMENTS

Figure 1:
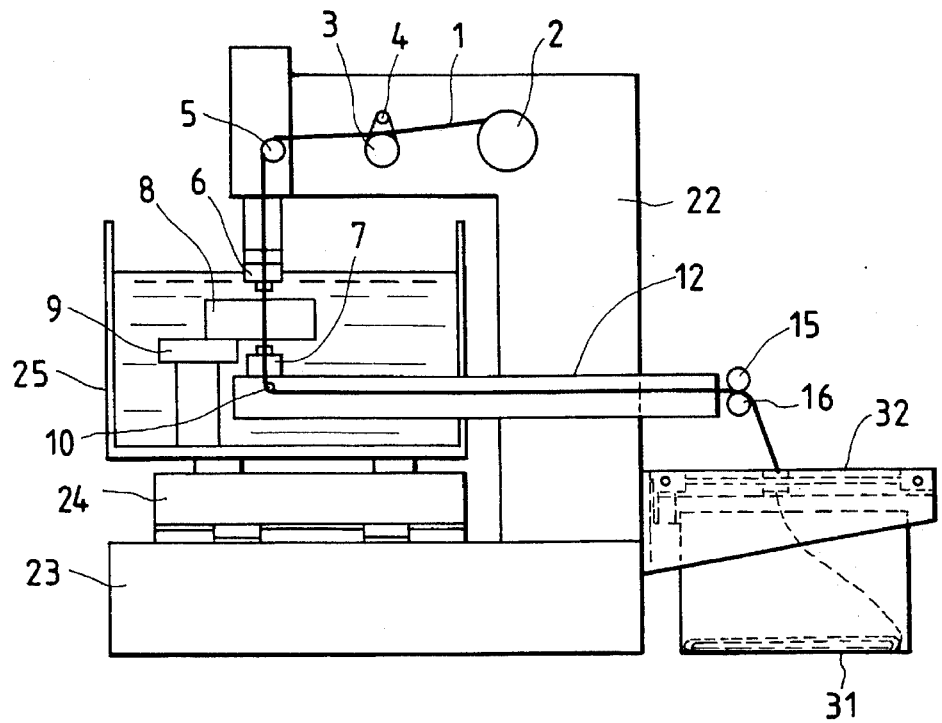
FIG. 1 shows a plan view of a first embodiment of the present invention.
Figure 2:
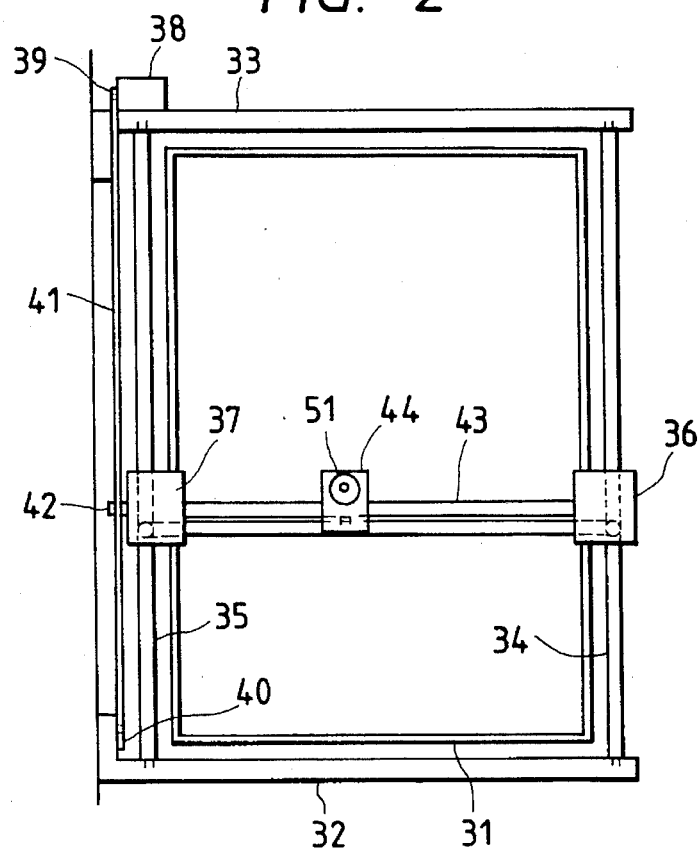
FIG. 2 shows a top view of the wire electrode collecting means of FIG. 1.
Figure 3:
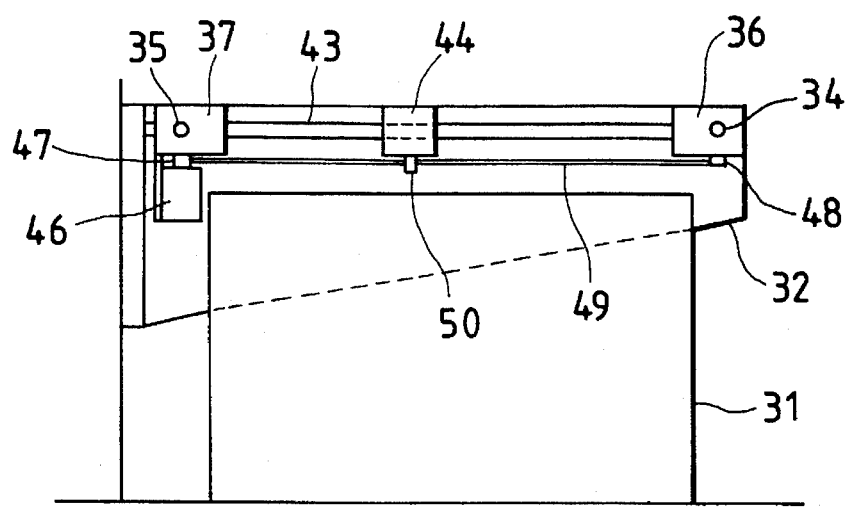
FIG. 3 shows a side view of the wire electrode collecting means of FIG. 1.
Figure 4:
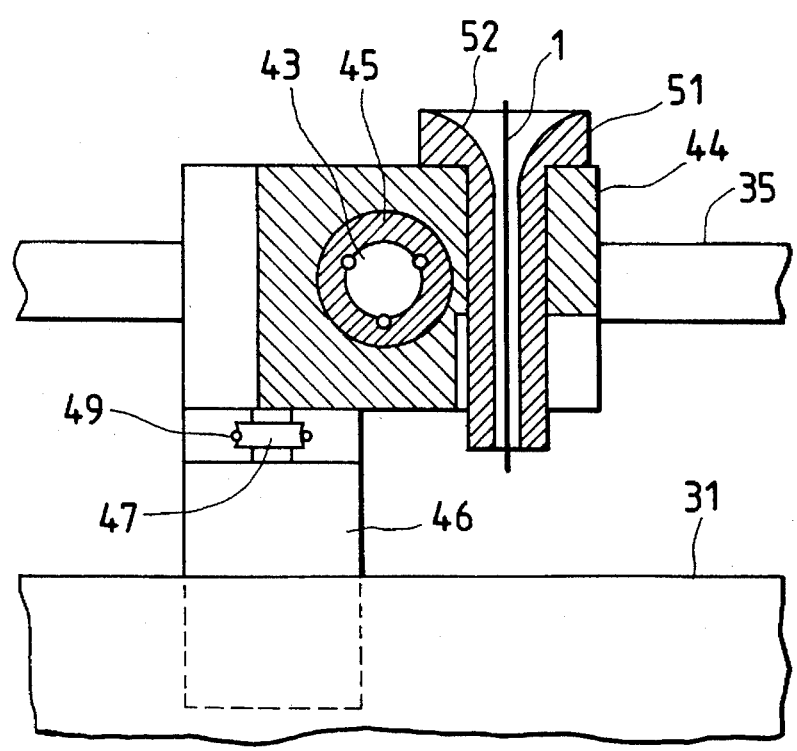
FIG. 4 shows a detailed sectional view of the wire guide of FIG. 1.
Figure 5:
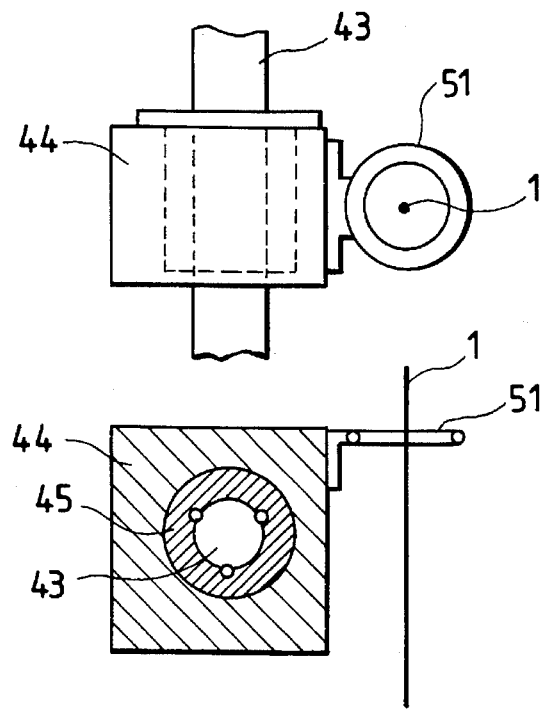
FIG. 5 shows top and side views of another embodiment of the wire guide of FIG. 1.
Figure 28:
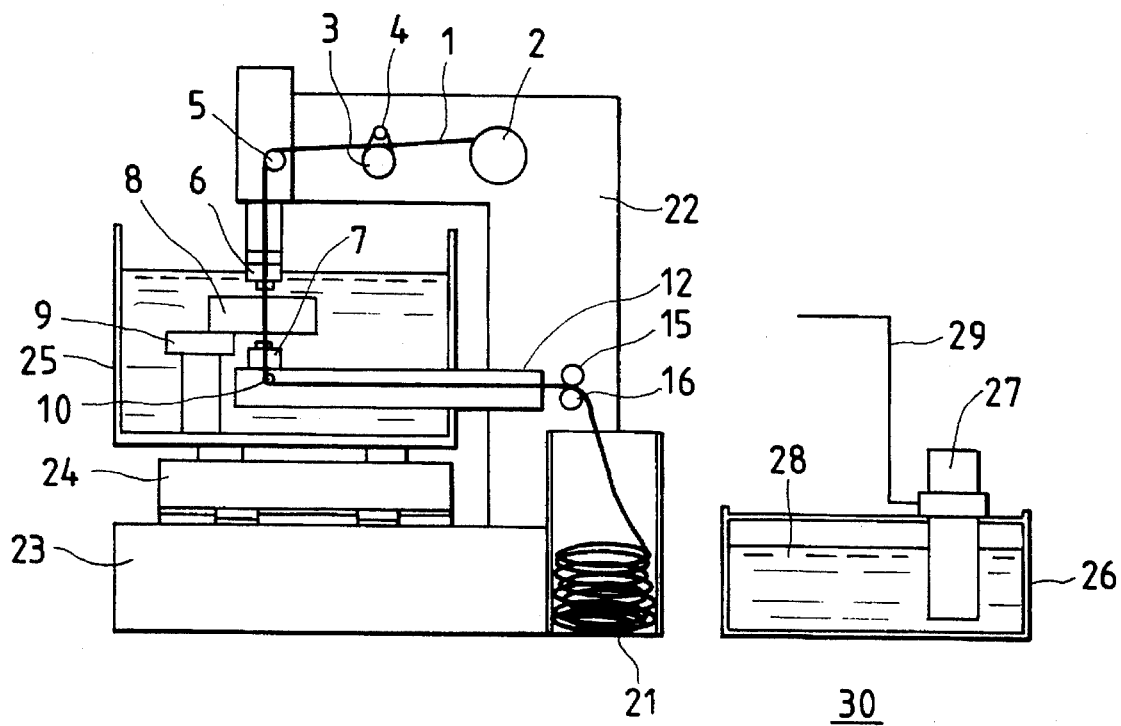
FIG. 28 is a general view illustrating a wirecut electrical discharge machine which is known in the art.
Figure 29:
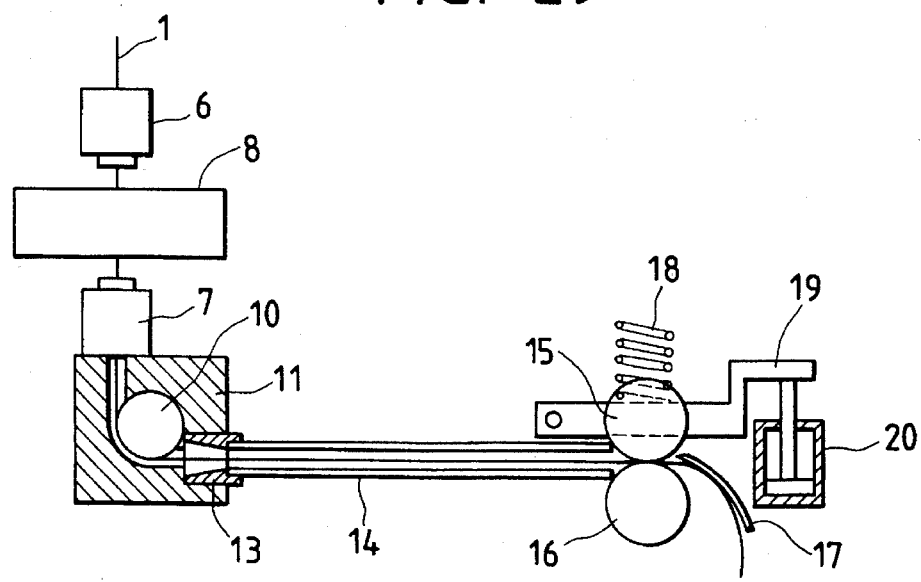
FIG. 29 is a detailed view of a wire electrode recovering section of a wirecut electrical discharge machine known in the art.
Figure 30:
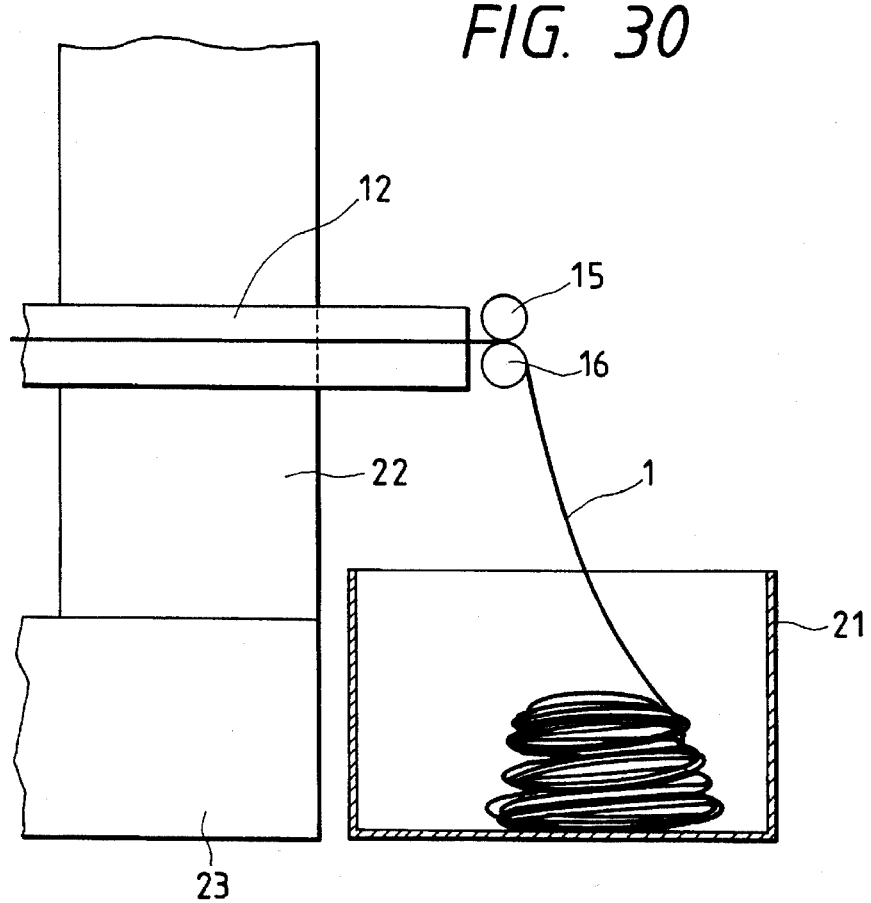
FIG. 30 illustrates an electric discharge machine known in the art which includes a large collecting means, and which shows the problem of wire electrode locally increasing.

FIG. 1 shows a general view of a wire electric discharge machine according to a first embodiment of the present invention, FIG. 2 shows a top view of a wire electrode collecting means of the machine, and FIG. 3 shows a sectional view of the wire electrode collecting means, viewed from a side thereof. FIGS. 4 and 5 show detailed views of a wire guide for guiding a wire electrode to be collected. In the above figures, a description of elements with numerals 1 through 30 is omitted because these elements are the same as those of the conventional machine discussed in connection with FIGS. 28–30, except for the collecting case 21. Also, elements with numerals 26 through 30 which relate to a well-known working fluid feeder are omitted from the figures.

Numeral 31 is a wire electrode collecting means which according to the present invention is larger than the conventional one. Numerals 32 and 33 are brackets which support both ends of Y-directional guide bars 34 and 35 and are secured to the column 22 or base 23. Numerals 36 and 37 are Y guide blocks which are engaged with Y-directional guide bars 34 and 35 by a bearing (not illustrated) respectively, and which can move in a vertical direction in FIG. 2. Numeral 38 is Y-directional driving means which includes a motor and an encoder, and is secured to the bracket 33. Numeral 39 is a pulley mounted on the Y-directional driving means 38, 40 is a pulley mounted on the bracket 32, and 41 is a belt. Part of the belt 41 is secured by a pin 42 supported by the Y guide block 37.

Numeral 43 is an X-directional guide bar in which both ends thereof are supported by Y guide blocks 36 and 37 respectively. Numeral 44 is an X guide block which is engaged with the X-directional guide bar 43 by a bearing 45 so that it can move in the X-direction. Numeral 46 is a pulley mounted on the X-directional driving means 46, 48 is a pulley mounted on the Y guide block 36, and 49 is a belt. Part of the belt 49 is secured to the pin 50 supported by the X guide block 44. Numeral 51 is a wire guide which is made of an insulating material. Alternatively or in addition to wire guide 51 being made of an insulating material, the guide portion 52 of the wire electrode 1 is insulated from the machine body such as the base 23 or column 22 and supported by the X guide block 44. FIG. 5 shows an annular wire guide 51 mounted on the X guide block 44.

The operation of the wire electric discharge machine shown in FIGS. 1–5 will now be explained.

Before starting electric discharge machining, a numerical control unit (not illustrated) starts feeding the wire electrode 1, and also feeds the working fluid 28 to the machining bath 25, upper guide 6, and lower guide 7 from the tank 26 of the working fluid feeder 30. While the wire electrode 1 is fed, the numerical unit drives the Y-directional driving means 38 and the X-directional driving means 46. The Y-directional driving means 38 rotates the pulley 39 to move the belt 41 tensioned between pulleys 39 and 40, and moves the Y guide block 37 in a Y-direction along the Y-directional guide bar 35 through the pin 42. The guide bar 43, Y guide block 36, and X guide block 44 which are supported by the Y guide block 37 move together in the Y-direction. The X-directional driving means 46 rotates the pulley 47 and moves the belt 49 to move the X guide block 44 in the X-direction along the X-directional guide bar 43 through the pin 50. The wire guide 51 supported by the X guide block 44 moves the wire electrode collecting means 31 according to the command of the numerical control unit by drawing a predetermined trace while guiding the fed wire electrode 1, thereby collecting the wire electrode 1.

According to the first embodiment, a wire electric discharge machine is provided in which the driving system of the wire guide 51 is mounted on the machine body and the driving means is controlled by a numerical control unit. It should be noted that while the first embodiment includes guides for moving in both the X- and y-directions, a single guide for moving in the X-direction can be provided in conjunction with a collection means movable in the Y-direction to obtain the same results. Likewise, a single guide movable in the Y-direction in conjunction with a collecting means movable in the X-direction could be provided to obtain the same results.

According to the second embodiment of the invention described below, a wire electric discharge machine provided in which driving means is mounted on the wire electrode collecting means 31 and a controller is provided separately from the numerical control unit.

Figure 6:
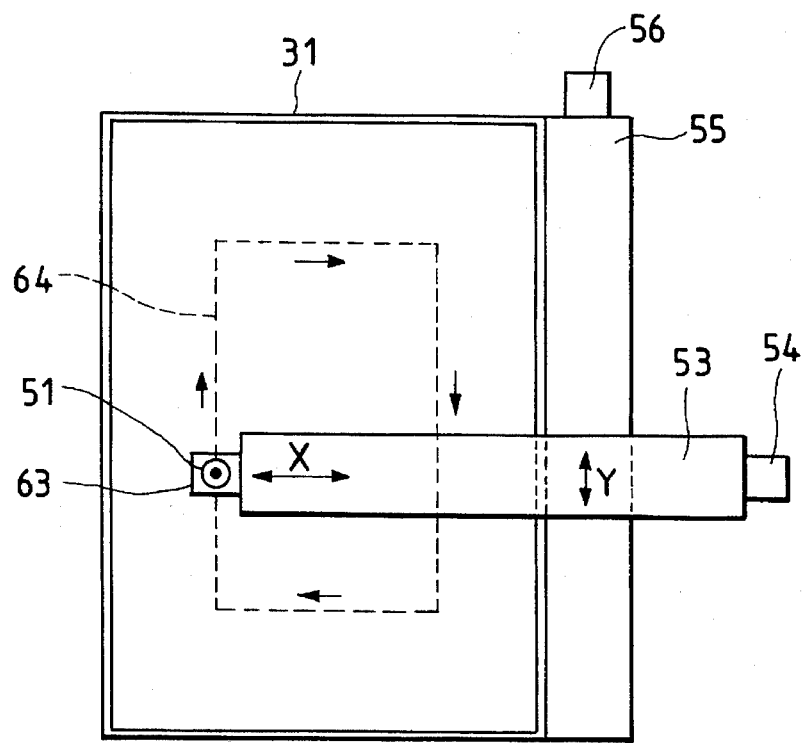
FIG. 6 shows a top view of the wire electrode collecting means of a second embodiment of the present invention.
Figure 7:
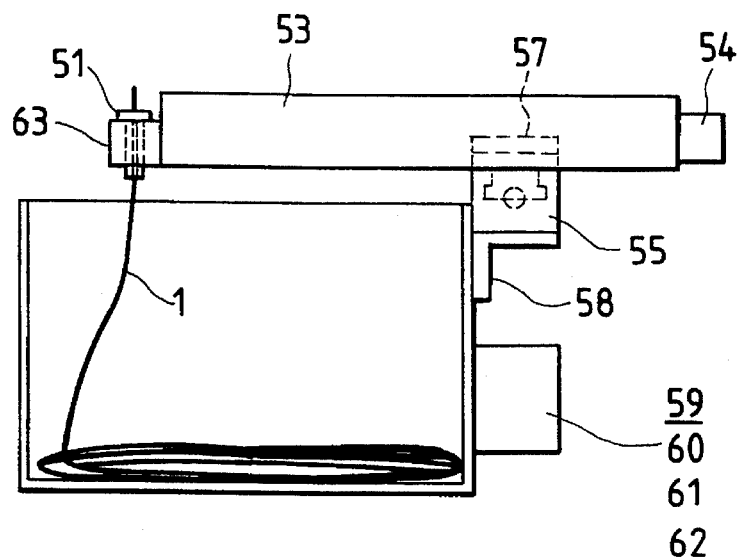
FIG. 7 shows a side view of the wire electrode collecting means of FIG. 6.
Figure 8:
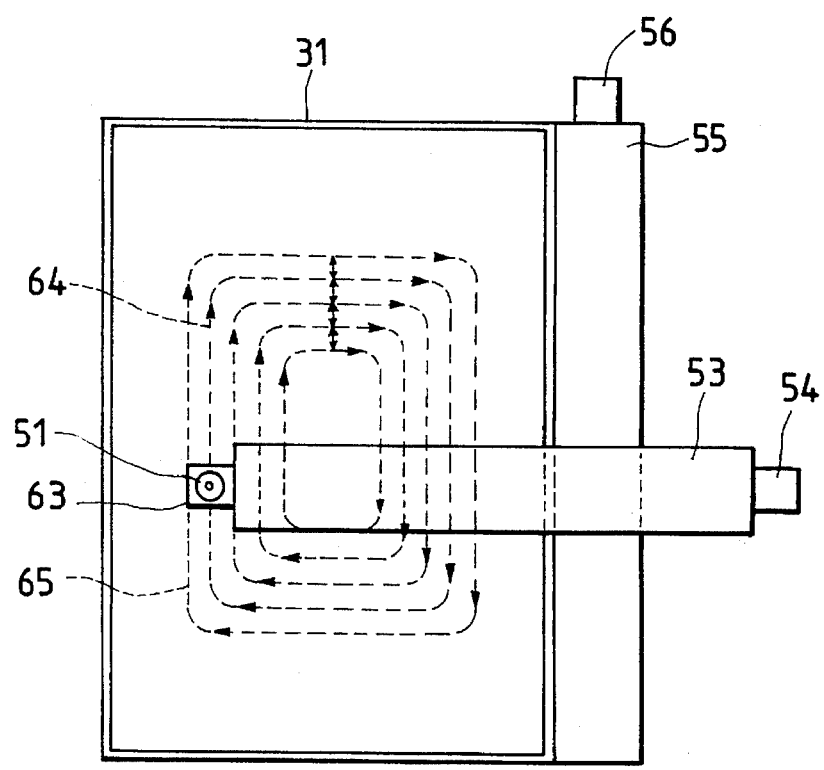
FIG. 8 shows a top view of the wire electrode collecting means for explaining the trace of the wire guide of FIG. 6.
Figure 9:
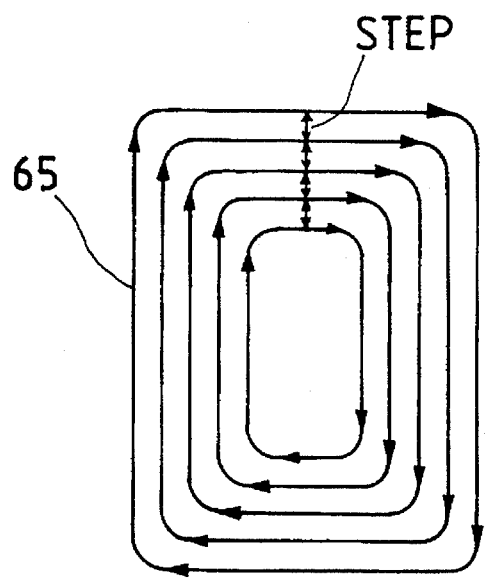
FIG. 9 shows an example of a trace of the wire guide of FIG. 6.
Figure 10:
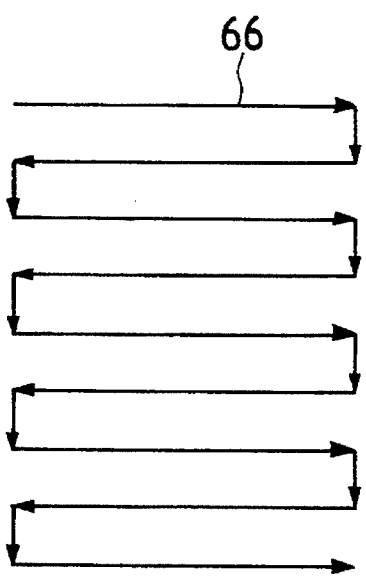
FIG. 10 shows an example of a trace of the wire guide of FIG. 6.
Figure 11:
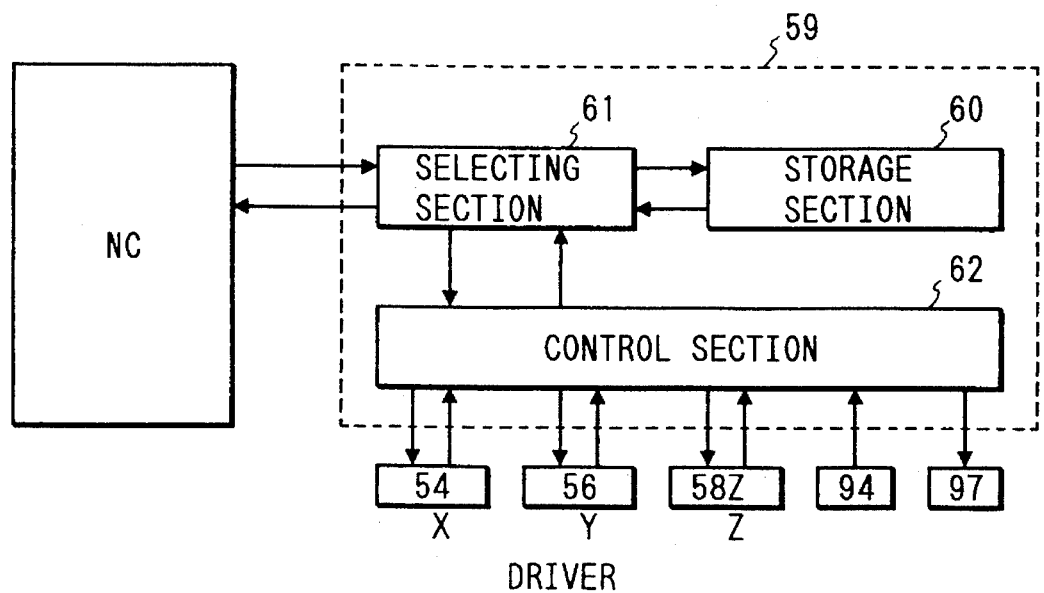
FIG. 11 is a block diagram illustrating a preferred embodiment of a wire guide control apparatus.
Figure 12:
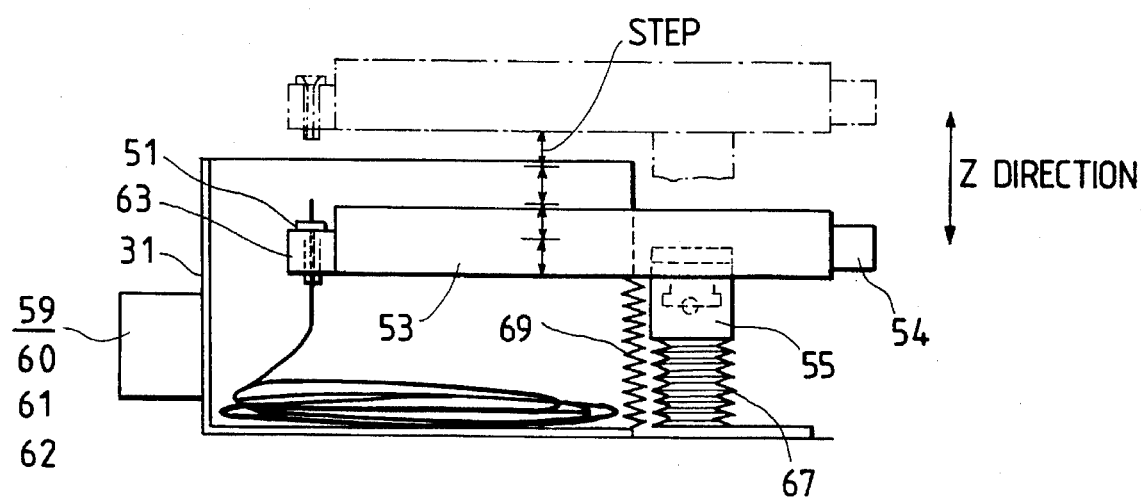
FIG. 12 is a side view of a wire electrode recovering section illustrating a modification to the second embodiment of the invention.
Figure 13:
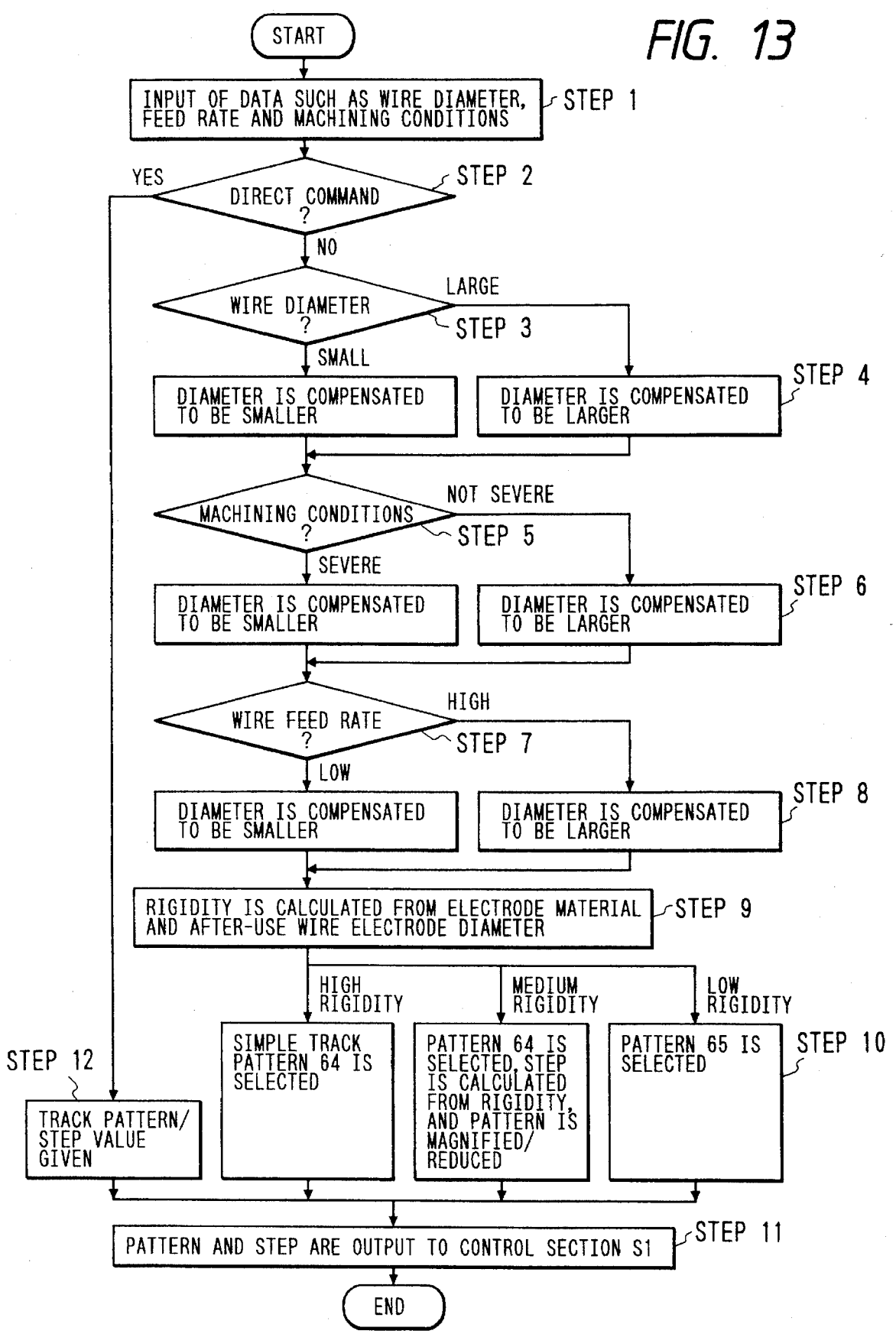
FIG. 13 is a flowchart illustrating a preferred embodiment of a wire guide track selection procedure according to the second embodiment.

Specifically, FIG. 6 shows a top view of the wire electrode collecting means according to the second embodiment of the present invention, and FIG. 7 shows a sectional view of the wire electrode collecting means, viewed from the side thereof. FIGS. 8, 9, and 10 show traces for collecting a wire electrode. FIG. 11 is a block diagram showing an embodiment of the control apparatus section, FIG. 12 is a side view showing a modification to the present embodiment, and FIG. 13 is a flowchart illustrating how the moving track of the wire guide 51 is selected. Because the machine body and the feed section of the wire electrode 1 are the same as the conventional machine body and feed section, respectively, only elements relating to the wire electrode collecting means 31 are described below.

Numeral 31 is wire electrode collecting means, 51 is a wire guide, 53 is an X-directional slider, and 54 is an X-directional driving means which includes a motor and an encoder. Numeral 55 is a Y-directional guide, and 56 is a Y-directional driving means which includes a motor and an encoder. Numeral 57 is a Y-directional slider having a section for guiding the X-directional slider 53 and a Y-directional guiding section, and numeral 58 is a bracket for securing the Y-directional guide 55 to the wire electrode collecting means 31.

The numeral 59 indicates a control apparatus employed for the wire electrode recovering means 31 and its details are shown in FIG. 11. Specifically, the reference numeral 60 indicates a storage section (e.g., memory) for storing the track patterns of the wire guide 51 and relationship data between machining conditions and track patterns, and 61 represents a selecting section which selects an appropriate track pattern from among those stored in the storage section 60 according to machining conditions, such as the size and feedrate of the wire electrode 1, including electrical machining conditions, e.g., a discharge current pulse width and stop time, or selects a track pattern from among those stored in the storage section 60 in response to a track pattern command given directly by the numerical control apparatus. The numeral 62 indicates a control section for controlling X-direction driving means 54, Y-direction driving means 56 and Z-direction driving means 58Z in accordance with the track pattern selected. The numeral 94 indicates detecting means for detecting that the wire electrode 1 has been recovered to a predetermined level within the wire electrode recovering means 31. The reference numeral 97 indicates a vibrating means for vibrating the wire electrode recovering means 31 in order to increase the recovery ratio of the wire electrode 1.

The numeral 63 (FIGS. 7–8) indicates a block which supports the wire guide 51 and is secured to the X-direction slider 53. The numerals 64, 65 and 66 in FIGS. 8–10, respectively, indicate tracks of the wire guide 51 at a time when the wire electrode 1 is recovered.

FIG. 12 shows a modification to FIGS. 6 and 7, having the Z-direction driving means for moving the wire guide 51 in the Z direction. Specifically, numeral 67 indicates a stand which is installed on a floor surface, and which supports a Y-direction guide. The stand 67 movably includes a guide (not shown) and the Z-direction driving means in the Z-direction. The numeral 69 indicates a bellows constructed so that the wire electrode 1 does not protrude when the wire guide 51 moves in the Z direction. The wire electrode recovering means shown in FIGS. 6, 7 and 12 are installed away from the machine shown in FIG. 1.

The operation of the present embodiment will now be described.

As in the first embodiment, after the feeding of the wire electrode 1 is started, that part of the wire electrode 1 fed through electrical discharge machining passes through the wire guide 51 and is collected by the wire electrode recovering means 31. As discussed, a track pattern of the wire guide 51 is selected. This selection process will now be described in accordance with FIG. 13.

The numerical control apparatus transmits information, such as the feed rate and size of the wire electrode 1, the electrical machining conditions, and the wire guide 51 track pattern and step value, to the control apparatus 59 (step 1). The control apparatus 59 judges whether or not the track pattern command has been given directly by the information from the numerical control apparatus (step 2), and if the track pattern command is not given directly, judges the diameter of the wire electrode 1 employed (step 3). If the wire electrode 1 diameter is large according to a predetermined criteria, it is estimated to be large after machining, and if it is small, it is estimated to be smaller (step 4). The machining conditions are then judged (step 5). If the machining conditions are severe, the diameter of the wire electrode 1 recovered is compensated to be smaller (i.e., the estimate of diameter is revised downwardly) since the wire electrode 1 is consumed more and the diameter of the wire electrode 1 is reduced after machining, and if the machining conditions are less severe, then the diameter is compensated to be larger (step 6). The feedrate of the wire electrode 1 is then judged (step 7). If the feedrate is high, then the diameter of the wire electrode 1 is compensated to be larger since the wire electrode 1 is consumed less, and if the feedrate is low, the diameter is compensated to be smaller (step 8). The rigidity of the wire electrode 1 already used is then calculated from the material and from the compensated diameter of the wire electrode 1 (step 9). If the rigidity is high, the selecting section 61 selects a simple track pattern such as, for example, track 64 in FIG. 6 because the wire electrode 1 is not easily bent. On the other hand, if the rigidity is extremely low, then the selecting section 61 selects the track pattern 66 shown in FIG. 10. If the rigidity calculated is medium, then the track pattern 65 shown in FIG. 9 is selected, the step value is then calculated from the rigidity value, and the track pattern is selected and set to be greater if the step value is large, and set to be smaller if the step value is small (step 10). The selecting section 61 outputs the track pattern and the step value to the control section 62 (step 11). If the track pattern and the step value are directly given by the numerical control apparatus (step 2), then the selecting section 61 selects the specified track pattern from among those stored in the storage section 60 (step 12) and outputs that pattern to the control section 62 together with the step value (step 11). The track pattern of the wire guide 51 is selected and set as described above.

Since the diameter of the wire electrode 1 after use may be determined (estimated) from the wire electrode 1 diameter, the machining conditions and the wire electrode 1 feedrate in FIG. 13, the track pattern and step value can be stored beforehand in the storage section 60 in correspondence with the parameters of the wire electrode 1 diameter, the machining conditions and the wire electrode 1 feedrate and found directly, without the rigidity of the wire electrode 1 being calculated. The control section 62 drives the X-direction driving means 54 and the Y-direction driving means 56 according to the selected track pattern, step value, etc. Guided by the Y-direction slider 57, the X-direction driving means 54 moves the X-direction slider 53 in the X-direction by means of a lead screw (not shown) to feed the block 63 and the wire guide 51 in the X direction. Similarly, guided by the Y-direction guide 55, the Y-direction driving means 56 moves the Y-direction slider 57 in the Y direction by means of a lead screw (not shown) to feed the block 63 and the wire guide 51 in the Y direction.

While the drop position of the wire electrode 1 shifts greater depending on the curl of the wire electrode 1 in FIGS. 6 and 7, the drop position will be more accurate and the wire electrode 1 can be recovered more efficiently if the Z-direction wire guide 51 position and step value are changed according to the recovery value of the wire electrode 1 as shown in FIG. 12.

The first and second embodiments of the invention show examples in which means for guiding the wire guide 51 in X and Y directions are provided on the machine body or the wire electrode collecting means 31. However, according to the third embodiment of the invention, it is also possible to provide the same guiding means to the working fluid feeder.

Figure 14:
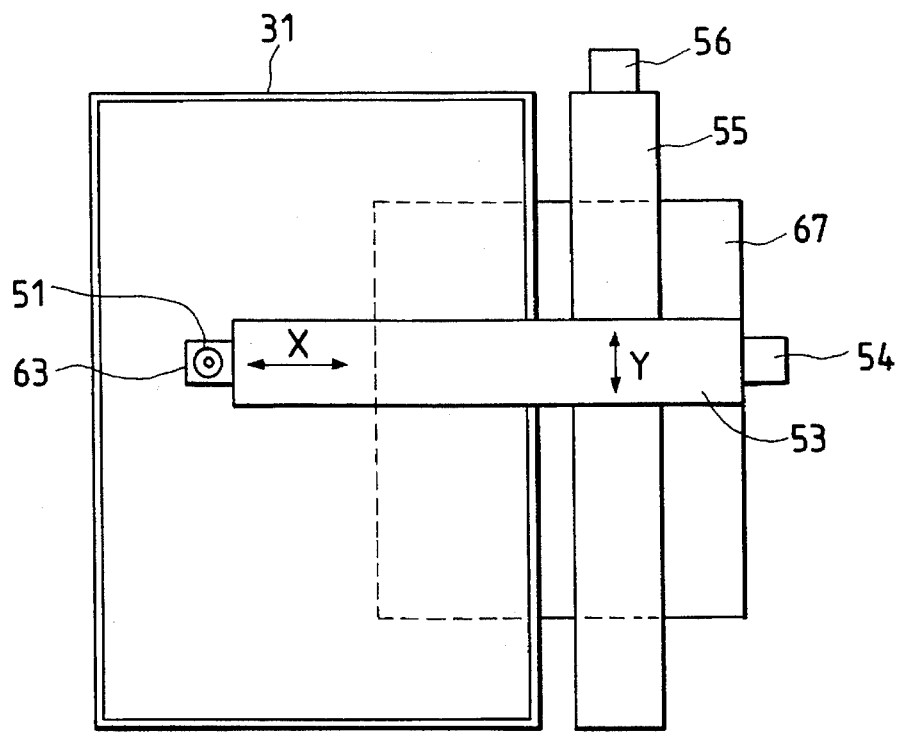
FIG. 14 is a plan view of a wire electrode recovering means according to another embodiment of the present invention.
Figure 15:
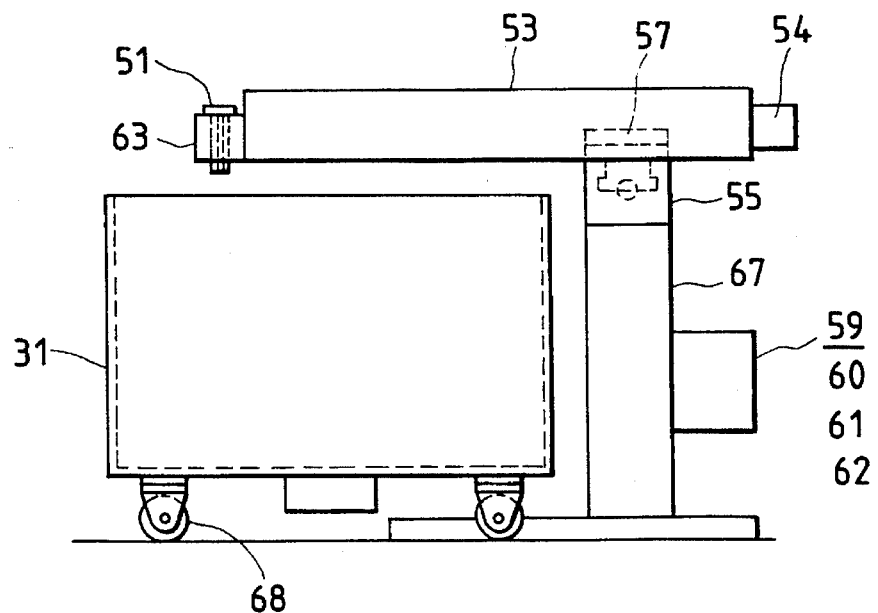
FIG. 15 is a side view of the wire electrode recovering means in FIG. 14.

FIGS. 14 and 15 show a fourth embodiment of the invention in which the Y-directional guide 55 in the second embodiment is supported by the stand 67 and X- and Y-directional guiding means are supported by the floor so that wire guide 51 is guided in the X- and Y-directions. In this embodiment, the wire electrode collecting means 31 can be removed by providing casters 68 on the bottom of the wire electrode collecting means 31. The X- and Y-directional guiding means, the machine body, wire electrode collecting means, and working fluid feeder are mounted on the floor. However, a modification can be made in which the X-directional guiding means is provided on the wire electrode collecting means and the Y-directional guiding means is provided on the machine body.

The fifth embodiment of the invention is a modification in which the wire guide 51 in the first and second embodiments is provided on a linkage.

Figure 16:
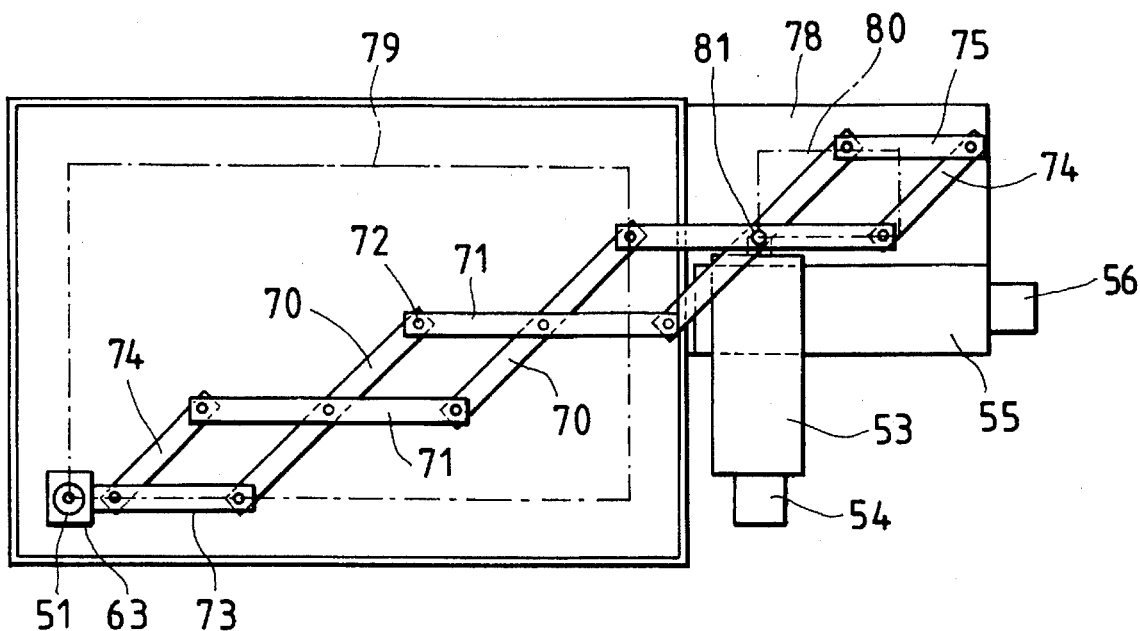
FIG. 16 is a plan view of wire electrode recovering means according to another embodiment of the present invention.
Figure 17:
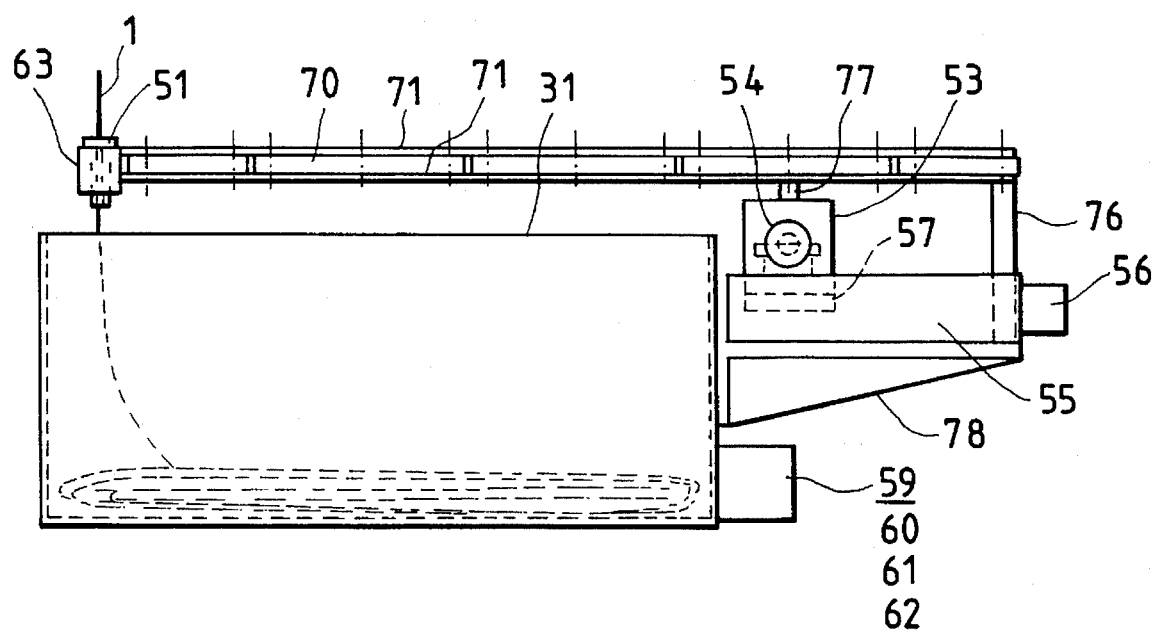
FIG. 17 is a side view of the wire electrode recovering means in FIG. 16.

FIG. 16 is a top view of the wire electrode collecting section showing an embodiment of the present invention, and FIG. 17 shows a side view of the collecting section. In FIGS. 16 and 17, numeral 31 is wire electrode collecting means, 51 is a wire guide, 53 is an X-directional slider, and 54 is an X-directional driving means which includes a motor and an encoder. Numeral 57 is a Y-directional slider having a section for guiding the X-directional slider 53 and a Y-directional guiding section. Numeral 59 is a controller which is the same as that of the second embodiment. Numerals 70 and 71 are levers constituting a link. As best shown in FIG. 16, the levers 70, 71 are interconnected by pins 72 in a manner which constrains the object end (block 63) to linear movement.

Three pins 72 are used for each lever 70 and three sets of levers 70 and 71 are used in this embodiment. Numeral 73 is a lever for supporting the block 63. Numerals 74 and 75 show levers with two pins 72. Two levers 75 are connected to both sides of the lever 74. Numeral 76 is a fixed shaft and 77 is a driving shaft. Numeral 78 is a bracket for securing the fixed shaft 76 and the Y-directional guide 55. Numeral 79 shows an example of the trace of the wire guide 51, and numeral 80 shows the trace of the driving shaft 77. Numeral 81 is a block which is secured to the X-directional slider 53 and secures the driving shaft 77. For this embodiment, the block 81 is secured to the wire electrode collecting means 31. However, it is also possible to mount the block 81 on the machine body, the working fluid feeder, or the floor.

The operation of the embodiment shown in FIGS. 16–17 will now be described.

As in the first embodiment, feeding of the wire electrode 1 is started and the wire electrode 1 of the portion fed due to electric discharge machining drops into the wire electrode collecting means 31 through the wire guide 51. The numerical control unit provides data for the feed rate, the size of the wire electrode 1, the feed trace of the wire guide 51, and machining conditions to the controller 59. In response to this data, the controller 59 selects a proper trace of the wire guide 51 and drives the X-directional driving means 54 and the Y-directional driving means 56. The X-directional driving means 54 moves the X-directional slider 53 in the X direction by a screw (not illustrated) according to guidance by the Y-directional slider 57, and moves the block 81 and driving shaft 77 in the X-direction. Similarly, the Y-directional driving means 56 moves the Y-directional slider 57 in the Y-direction by a screw (not illustrated) according to guidance by the guide 55 and sends the X-directional slider 53, block 81, and driving shaft 77 to be guided by the Y-directional slider 57 in the Y-direction. The trace 80 of the driving shaft 77 is enlarged by a pantograph consisting of levers 70, 73, 74, and 75, and the pins 72, to obtain the trace 79 of the wire guide 51.

Figure 18:
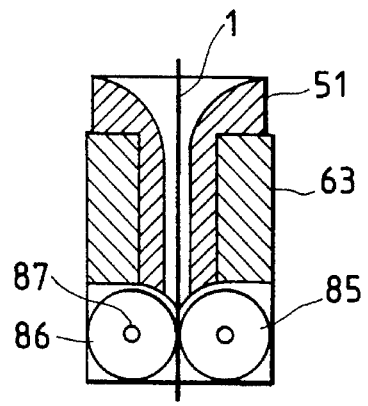
FIG. 18 is a sectional side view of a wire guide section according to another embodiment of the present invention.

FIG. 18 shows a sectional view of a further embodiment of the wire guide 51. In FIG. 18, numeral 1 is a wire electrode, 51 is a wire guide, and 63 is a block. Numerals 85 and 86 are pinch rollers to which apply pressure so as to feed the wire electrode 1 coming out of the conventional pinch rollers 15 and 16 at the body side of the machine to the wire electrode collecting means 31. Numeral 87 is a motor having a shaft connected with the rotational shaft of the pinch roller 86. The pinch rollers 85 and 86 rotate at a speed that is slightly higher than the speed obtained by totaling the feed speed of the wire electrode 1 and the moving speed of the wire guide 51; the speed of the pinch rollers 85 and 86 is controlled so that the wire electrode 1 does not sag at the pinch rollers 85 and 86 during their rotation.

Figure 19:
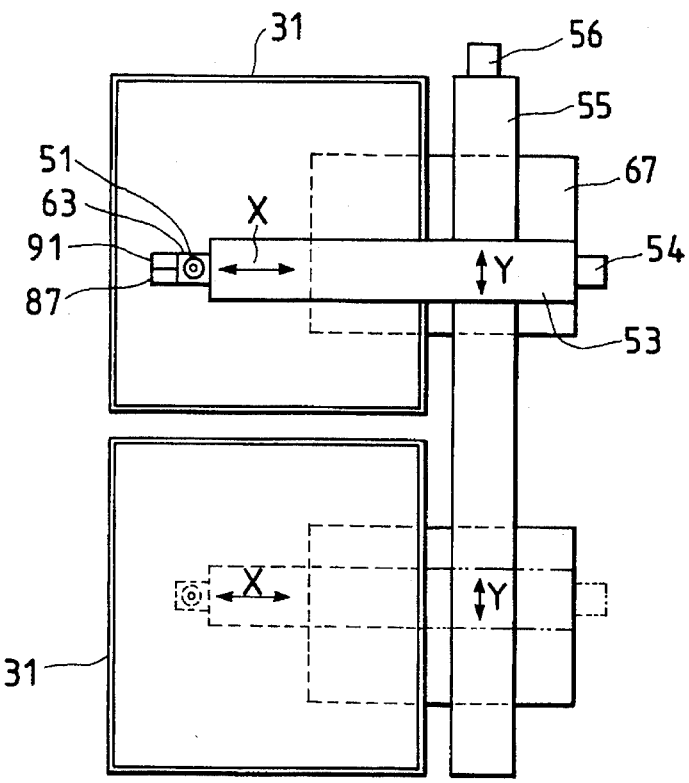
FIG. 19 is a plan view of a wire electrode recovering means according to another embodiment of the present invention.
Figure 20:
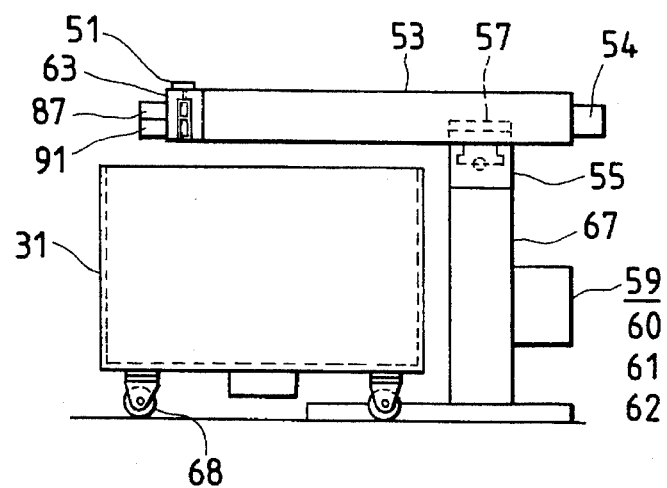
FIG. 20 is a side view of the wire electrode recovering means of FIG. 19.
Figure 21:
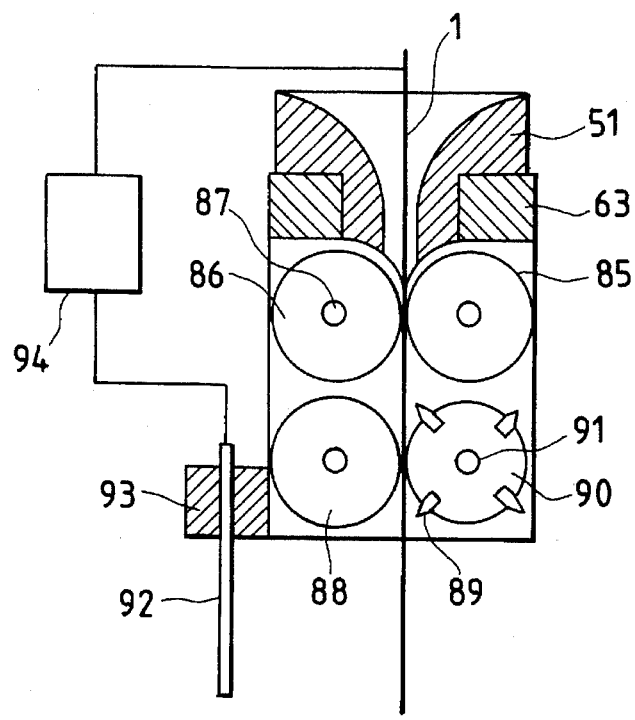
FIG. 21 is a sectional view of a wire guide section according to the FIG. 19 embodiment.
Figure 22:
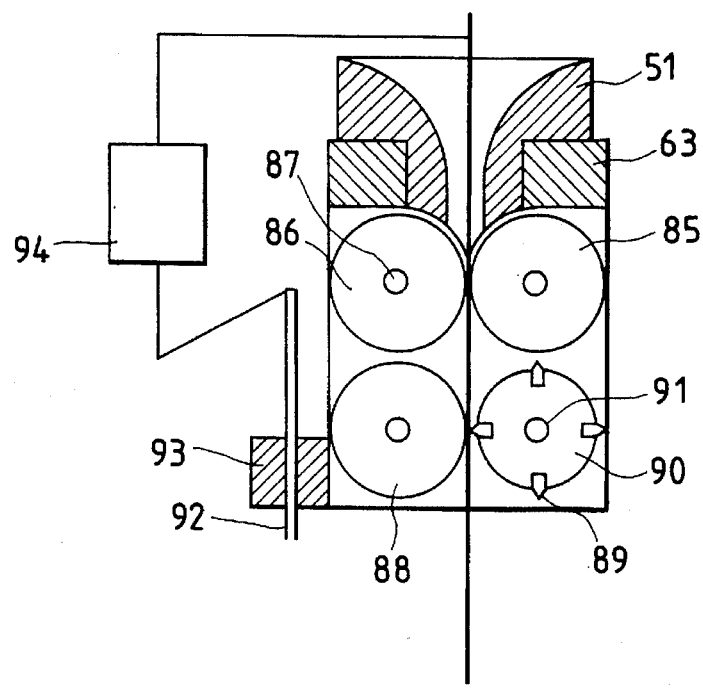
FIG. 22 is a sectional view of the wire guide section in the FIG. 19 embodiment.

FIG. 19 shows a top view of a further embodiment of the present invention, FIG. 20 is a side view of the embodiment, and FIGS. 21 and 22 show detailed views of a wire guide. In these figures, the structure and operation of the guiding means in the X- and Y-directions are almost the same as those of the second embodiment, and the structure and operation of the supporting means of the guiding means are almost the same as those of the fourth embodiment. Therefore, only those elements that are different in shape and operation are described below.

According to this embodiment, two sets of the wire electrode collecting means 31 are provided. The stroke of the Y-directional guiding means 55 is changed so that it can move on the two sets of wire electrode collecting means 31. Numeral 63 is a block for supporting the wire guide 51, which is supported by the X-directional slider 53. Numerals 85 and 86 are pinch rollers which are rotatably supported by the block 63 to which pressure capable of holding the wire electrode 1 coming out of the conventional pinch rollers 15 and 16 of the mechanical system and sending it to the wire electrode collecting means 31, is applied. Pinch rollers 85 and 86 are rotated at a speed that is slightly higher than the speed obtained by totaling the feed speed of the wire electrode 1 and the moving speed of the wire guide 51. The speed of the pinch rollers 85 and 86 is thus controlled so that the wire electrode 1 slips between the pinch rollers during their rotation. Numeral 88 is a roller, 90 is a cutting roller, and 89 is a cutter which is secured to the cutting roller 90. The cutting roller 90 is provided with driving means such as the motor 91. Numeral 92 is a wire electrode detecting pin, 93 is a support, and 94 is a means for detecting the amount of wire electrode. The detecting means 92 sends a contact signal to the controller 59 when voltage is supplied between the wire electrode 1 and the detecting pin 92 of the wire electrode 1 in the wire electrode collecting means 31 and the detecting means 94 contacts the detecting pin 92.

The embodiment shown in FIGS. 19–22 will now be described.

The moving means operates so that the wire guide 51 draws a certain trace as shown at the top of FIG. 19. When the amount of wire electrode 1 reaches a certain level in the wire electrode collecting means 31, the detecting pin 92 contacts the wire electrode 1 and the detecting means 94 sends the contact signal to the controller 59. In response to the contact signal, the controller 59 sends a rotation command to the motor 91 to make the roller 90 cut the wire electrode 1, as shown in FIG. 22. Then, the detecting pin 92 is raised from the position shown in FIG. 22 by driving means (not illustrated). The X-directional slider 53 and the wire guide 51 move to the other-side wire electrode collecting means 31 along the Y-directional guiding means 55. Then, the moving means is operated by the controller 59 so that it draws a certain trace.

It is also possible to detect the collected amount of the wire electrode 1 according to, for example, the weight of wire electrode as described in Japanese Patent Laid-Open No. 2-131820 or to change the wire electrode collecting means by calculating the consumption of wire electrode according to the feed speed, size, and feed time of the wire electrode 1 using a numerical control unit. It will also be appreciated that the plurality of wire electrode recovering means 31 described in the present embodiment may be replaced with a single wire electrode recovering means 31 which performs the recovering operation after the wire guide 51 has been moved to another position at the top of the wire electrode recovering means 31 under the control of a signal from the wire electrode detecting means 94 (for example, the track pattern 64 in FIG. 6 is made small and the wire guide 51 is moved in two or more track patterns at the top of the recovering section of the single wire electrode recovering means 31). It will also be appreciated that the recovering operation may be performed by moving the wire guide 51 upward by a predetermined step value in the Z direction as shown in FIG. 12 under the control of the signal from the detecting means 94, in order to recover the wire electrode 1 efficiently.

Figure 23:
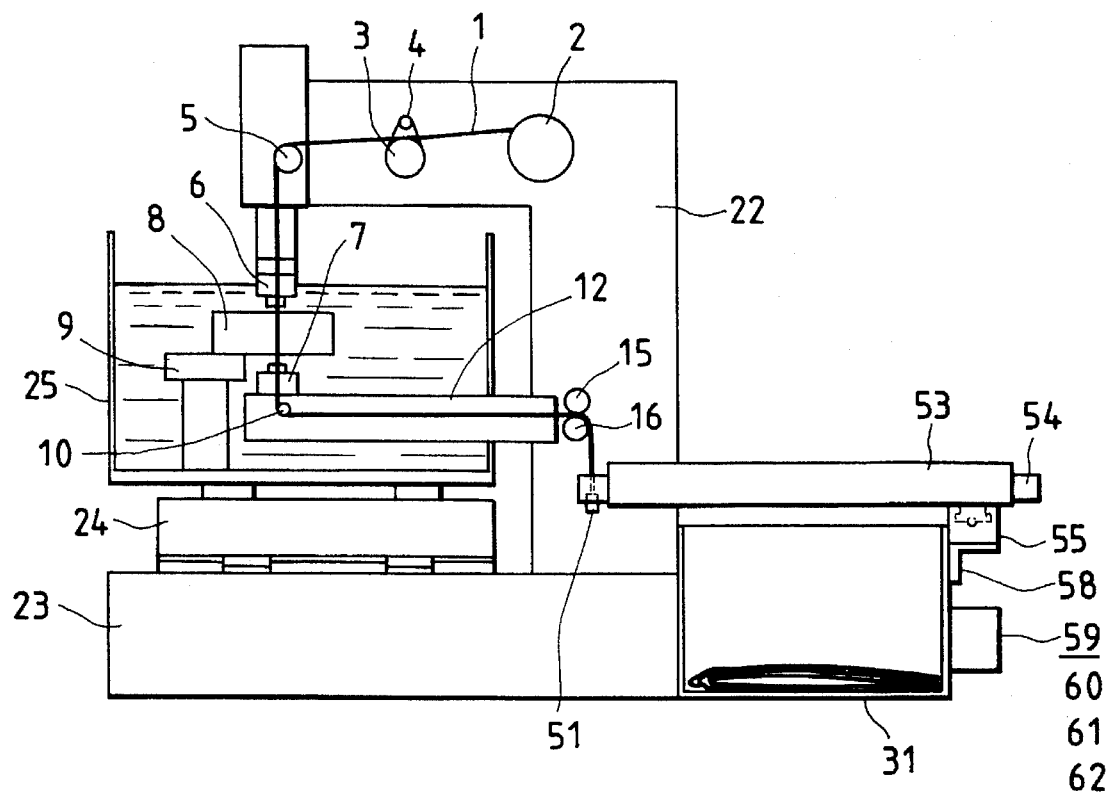
FIG. 23 is a general view of another embodiment of the present invention.
Figure 24:
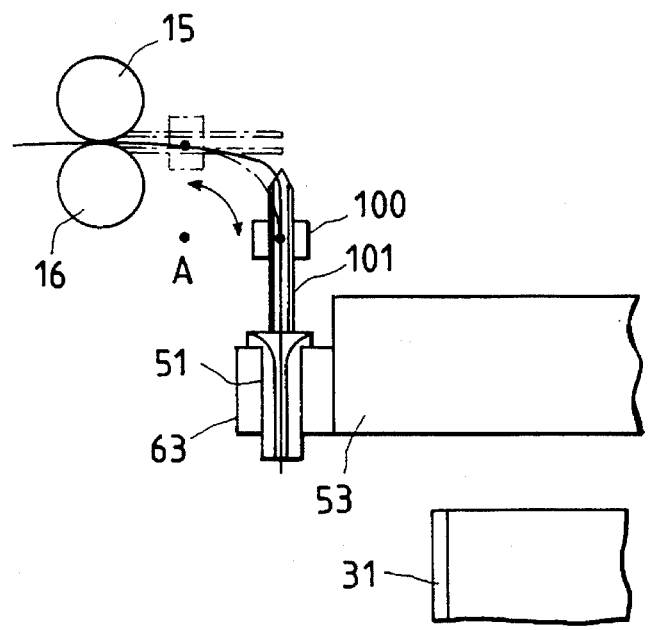
FIG. 24 is a partial detailed side view of the FIG. 23 embodiment.

FIGS. 23 and 24 show a modification to the second embodiment, wherein the wire guide 51 is designed to be movable up to the vicinity of the pinch rollers 15, 16, and the recovering operation is performed when the wire guide 51 has moved to the vicinity of the wire electrode recovering means 31 after the wire electrode 1 passes through the wire guide 51. The numeral 100 (FIG. 24) indicates supporting means for supporting and pivoting a pipe 101 90° on point A. Specifically, the pipe 101 is initially horizontal as indicated by the long and two short dashes line in FIG. 24. After the used wire electrode 1 is caught in the pipe 101 in the vicinity of the pinch rollers 15, 16, the supporting means 100 is pivoted 90° to insert the end of the wire electrode 1 from the end of the pipe 101 into the wire guide 51. The wire guide 51 then moves up to the top of the wire electrode recovering means 31 and travels on a predetermined track for the recovering operation. The guide moving means provided in the wire electrode recovering means 31 in FIGS. 23 and 24 may also be provided at various locations such as the floor surface, the dielectric fluid supply apparatus, etc.

Further, the pipe 101 which is employed as a catching means may be a robot which grasps the end of the wire electrode 1 in the vicinity of the pinch rollers 15, 16 of the machine and transfers the wire electrode 1 until it is passed into the wire guide 51 of the wire electrode recovering means 31.

Figure 25:
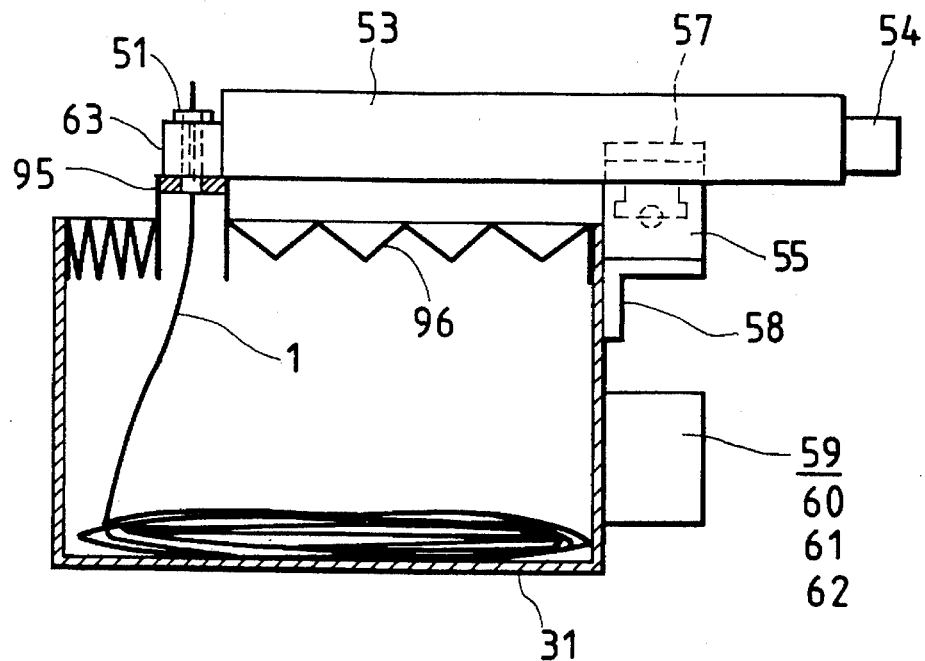
FIG. 25 is a side view of a wire electrode recovering means according to another embodiment of the present invention.
Figure 26:
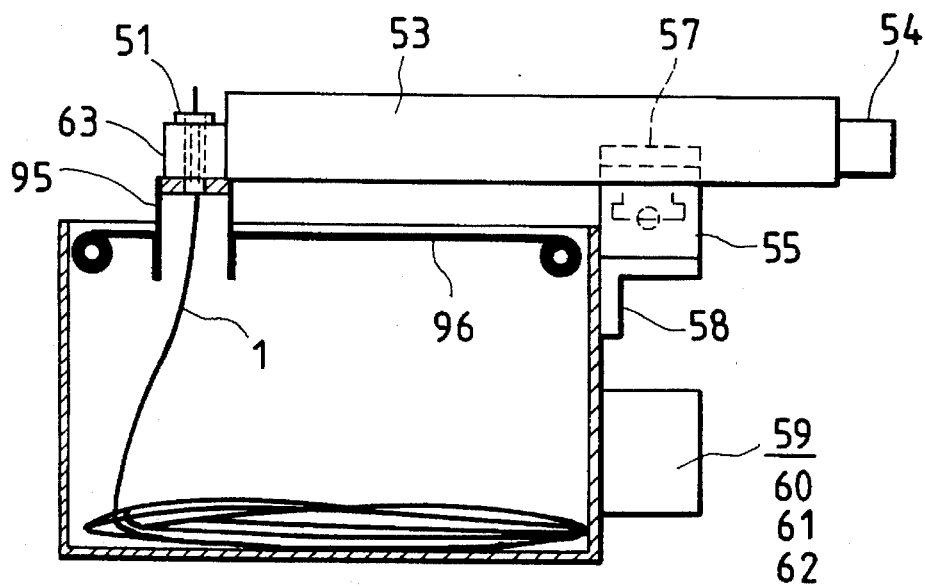
FIG. 26 is a side view of the wire electrode recovering means in the FIG. 25 embodiment.

FIGS. 25 and 26 show embodiments in which a shielding member, such as a bellows, is provided on the upper opening portion of the wire electrode collecting means 31 of the second embodiment 2. In FIGS. 25 and 26, numeral 96 is a connecting member for connecting the block 63 with the bellows 95. One bellows 96 is enough when it is very telescopic and the wire guide 51 has a short stroke. For the bellows 96 to be wound on a roller as shown in FIG. 26, a bellows (not illustrated) with a small width approximately equal to that of the block 63 is also necessary in Y direction. The shielding member prevents the wire electrode 1 from overflowing from the opening portion due to movement of the wire guide 51, prevents foreign matter from entering the opening portion, and also prevents an operator from being subjected to an electrical shock. It is also possible to use a bellows made from laminated plates.

Figure 27:
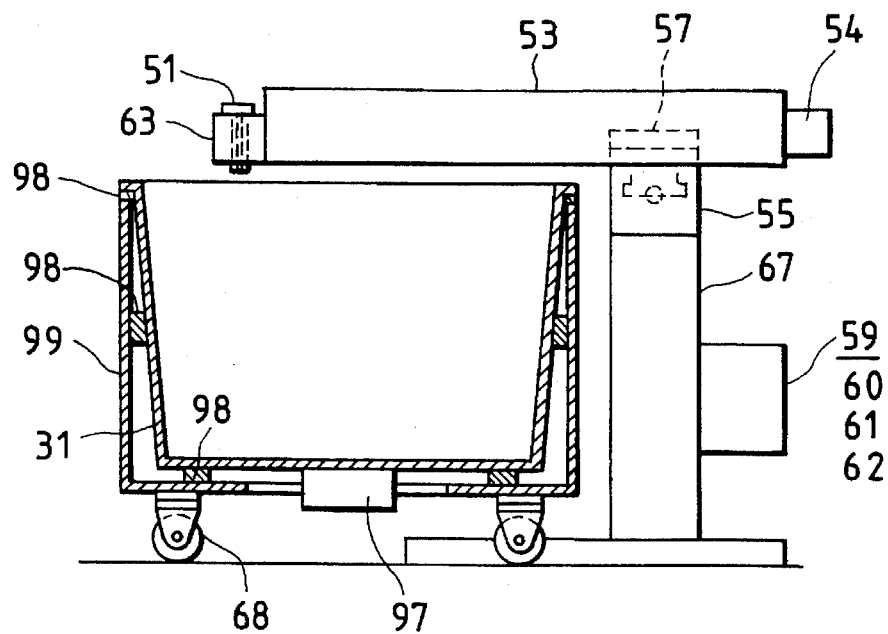
FIG. 27 is a side view of another embodiment of the present invention.

FIG. 27 shows an embodiment in which a vibration generator is provided at the bottom of the wire electrode collecting means 31. In FIG. 27, numeral 97 is a vibrating means which includes, for example, an eccentric weight provided on the rotational shaft of a motor to generate vibration. Numeral 98 is a cushion which is connected to the wire electrode collecting means 31 or supporting means 99 to prevent vibrations produced by the vibrating means 97 from being transferred to the mechanical system or the floor. The vibrating means 97 is controlled by the controller 59 for the wire electrode collecting means 31 or a numerical control unit (not illustrated). The vibrating means 97 generates vibrations continuously or intermittently, or for a certain amount of time in accordance with the collected amount of the wire electrode 1 or by calculating the wire feed rate, and the wire electrode collecting means 31 vibrates so as to move to the direction and position where the collected wire electrode 1 is stabilized. Thus, the height of collected wire electrode 1 is uniform. It is also possible to use hydraulic pressure or a magnetostrictive element for electrically generating vibrations for the vibrating means.

The wire guide 51 in the embodiments described above moves on the wire electrode collecting means 31. However, it is also possible to guide and collect the wire electrode 1 by forming an opening at the side of the wire electrode collecting means, passing the wire guide 51 through the opening, and moving the wire guide 51 in the X- or Y-direction. Also, it is apparent that elements of a particular embodiment may be employed in other embodiments.

The configuration of the wire electric discharge machine according to the invention provides the following effects.

Since the wire guide for collecting a wire electrode in the wire electrode collecting means can move in X and Y directions, it is possible to increase the size of the wire electrode collecting means, uniformly collect the wire electrode, and continue machining for a relatively long time.

Since X- and Y-directional moving means are provided on the body of the wire electric discharge machine, the working fluid feeder, or the floor, the wire electrode collecting means can move and can be readily changed. When the moving means are provided on the floor, it is possible to freely arrange the wire electrode collecting means.

Since guiding means for moving the wire guide is provided on the wire electrode collecting means, it is possible to freely set the arrangement of the wire electrode collecting means and increase the size of the wire electrode collecting means.

Since the numerical control unit or a controller for the wire electrode collecting means is used, the trace of the wire guide is stored as patterns so that the wire guide can be moved by selecting the patterns or enlarging or contracting them, and the collection efficiency can be changed according to the change of the shape or wire diameter (stiffness) of the wire electrode. Further, when a controller is used for the wire electrode collecting means, it is possible to execute fine control because the numerical control unit requires only data concerning the size of the wire electrode and the machining conditions, such as electrical machining conditions. Thus, the processing load of the numerical control unit can be decreased.

Since take-up rollers are provided nearby the wire guide, the wire electrode to be collected does not sag up to the wire guide. Therefore, when the wire electrode cannot be collected because of, for example, a natural dropping or when the wire electrode collecting means is separately arranged, the wire electrode can be securely collected. Also, because the position of the wire electrode collecting means can be raised, the capacity can be increased and machining can be executed for a long time.

Since the wire electrode collecting means can be changed by detecting that the collected amount of wire electrode reaches a certain level, cutting the wire electrode, and changing the collecting position, it is possible to eject the wire electrode collected in the wire electrode collecting means during machining and to continue machining.

With the means for catching the wire electrode ejected from the wire electrode take-up rollers and transferring it onto the wire electrode collecting means, it is possible to freely set the arrangement of the wire electrode collecting means and execute automatic collection.

When a shielding member, such as a bellows or boot is provided on part of, or at least on one face of the wire electrode collecting means for collecting wire electrode, it is possible to prevent an operator from being subjected to an electrical shock, to prevent wire electrode from overflowing from the collecting means, and to prevent foreign matter from entering the collecting means.

When vibrating means is provided on the wire electrode collecting means for collecting wire electrode, the collected wire electrode is moved to a stable position (e.g., caused to settle) by vibration. Therefore, used wire electrode can be uniformly collected, the collection efficiency can be improved, and machining can be executed for a long time.

While various embodiments and modifications of the invention have been described, it will become apparent to those skilled in the art that changes and modifications can be made thereto.

What is claimed is:

1. A wire electric discharge machine comprising:

wire electrode collecting means for collecting a wire electrode previously used for electric discharge machining, said wire electrode collecting means having an upper section thereof;

vibrating means for vibrating said wire electrode collecting means;

a wire guide for guiding the used discharge electrode to said wire electrode collecting means; and guiding means for guiding said wire guide through a path, said guiding means being disposed at the upper section of said wire electrode collecting means, said path being one of linear and a combination of linear and arcuate.

2. A wire electric discharge machine according to claim 1, wherein the guiding means is supported by one of a body of the wire electric discharge machine, the wire electrode collecting means, a working fluid feeder, and a floor surface.

3. A wire electric discharge machine as recited in claim 1, wherein said wire guide and said guiding means are disposed above said wire electrode collecting means.

4. A wire electric discharge machine as recited in claim 1, further comprising means for storing a moving trace which represents said path.

5. A wire electrical discharge machine comprising:

wire electrode recovering means for recovering a wire electrode previously used for electrical discharge machining, said wire electrode recovering means having a top recovering section;

vibrating means for vibrating said wire electrode recovering means;

a movable wire guide for guiding said used wire electrode to said wire electrode recovering means;

driving means for driving said wire guide through a path, said driving means being disposed in the top recovering section of said wire electrode recovering means, said path being one of linear and a combination of linear and arcuate; and means for storing a moving trace of said wire guide which represents said path, and for controlling said driving means on the basis of said stored moving trace.

6. A wire electric discharge machine according to claim 5, further comprising means for controlling said path of the wire guide by one of enlarging and reducing the stored moving trace.

7. A wire electric discharge machine according to claim 5, wherein the storing means stores the trace of a wire guide as a plurality of different patterns, and wherein the machine further comprises means for selecting one of the different patterns, and means for driving the wire guide according to the selected one of the patterns.

8. A wire electric discharge machine according to claim 5, wherein said storing means stores a plurality of moving trace patterns.

9. A wire electric discharge machine comprising:

a plurality of wire electrode collecting means for collecting a wire electrode previously used for electric discharge machining;

detecting means for detecting when the previously used wire electrode in a first one of said plurality of wire electrode collecting means reaches a predetermined quantity;

a wire guide for guiding the wire electrode to said first wire electrode collecting means;

driving means for driving said wire guide at an upper collecting section of said one wire electrode collecting means; and means for storing a trace of said wire guide in a program to control said driving means;

wherein said wire guide is moved according to a detected state of said detecting means to a second wire electrode collecting means which is different from said first wire electrode collecting means.

10. A wire electrical discharge machine comprising:

wire electrode recovering means for recovering a wire electrode previously used for electrical discharge machining while simultaneously guiding the wire electrode by means of a wire guide;

detecting means for detecting that the wire electrode in said wire electrode recovering means has reached a predetermined value; and wherein one of a height and a recovery position of said wire guide is changed according to a detected state of said detecting means.

11. A wire electric discharge machine comprising:

wire electrode collecting means for collecting a wire electrode previously used for electric discharge machining;

vibrating means for vibrating said wire electrode recovering means;

a wire guide for moving an upper collecting section of said wire electrode collecting means through a path which is one of said path being one of linear and a combination of linear and arcuate; and cutting means for cutting a wire electrode mounted adjacent said wire guide.

12. A wire electric discharge machine comprising:

wire electrode collecting means for collecting a wire electrode previously used for electric discharge machining;

vibrating means for vibrating said wire electrode recovering means;

a wire guide for guiding the wire electrode to said wire electrode collecting means;

driving means for driving said wire guide through a path at an upper collecting section of said wire electrode collecting means, said path being one of linear and a combination of linear and arcuate; and catching and transferring means for catching an ejected wire electrode and transferring the wire electrode to said wire electrode collecting means.

13. A wire electric discharge machine comprising;

wire electrode collecting means for collecting a wire electrode previously used for electric discharge machining, said wire electrode collecting means having an upper section;

a movable wire guide for guiding the used discharge electrode to said wire electrode collecting means;

storing means for storing a moving trace of said wire guide which represent a plurality of paths;

guiding means for guiding said wire guide through one of said paths, said guiding means being disposed at the upper section of said wire electrode collecting means, said paths being one of linear and a combination of linear and arcuate; and means for estimating a rigidity of the wire electrode and for selecting an optional one of said paths based on the estimated rigidity of the wire electrode.

14. A wire electric discharge machine as recited in claim 13, wherein said guiding means is movable in at least two different directions.

15. A wire electric discharge machine comprising:

wire electrode collecting means for collecting a wire electrode previously used for electric discharge machining;

storing means for storing a moving trace of said wire guide which represent a plurality of paths;

means for guiding the previously used wire electrode to said wire electrode collecting means, said guiding means being movable through one said paths which is one of linear and a combination of linear and arcuate relative to said wire electrode collecting means in at least two different directions; and means for estimating a rigidity of the wire electrode and for selecting an optional one of said paths based on the estimated rigidity of the wire electrode.

16. A wire electric discharge machine as recited in claim 15, wherein said guiding means is movable in at least two different directions.

\* \* \* \* \*